(12) United States Patent
Frugoli (10) Patent No.: US 10,328,325 B2
(45) Date of Patent: Jun. 25, 2019

(54) VOLLEYBALL TRAINING AID

(71) Applicant: Geno Frugoli, Shawnee, KS (US)

(72) Inventor: Geno Frugoli, Shawnee, KS (US)

(73) Assignee: Geno Frugoli, Denton, TX (US)

( * ) Notice: Subject to any disclaimer, the term of this patent is extended or adjusted under 35 U.S.C. 154(b) by 0 days.

(21) Appl. No.: 15/666,429

(22) Filed: Aug. 1, 2017

(65) Prior Publication Data

US 2018/0028890 A1    Feb. 1, 2018

Related U.S. Application Data

(60) Provisional application No. 62/369,258, filed on Aug. 1, 2016.

(51) Int. Cl.
*A63B 69/38* (2006.01)
*A63B 69/00* (2006.01)
*G09B 19/00* (2006.01)

(52) U.S. Cl.
CPC ...... *A63B 69/0095* (2013.01); *G09B 19/0038* (2013.01); *A63B 2209/08* (2013.01); *A63B 2225/09* (2013.01); *A63B 2243/0095* (2013.01)

(58) Field of Classification Search
CPC ............ A63B 69/0095; A63B 21/0004; A63B 21/4011; A63B 21/4047
USPC ......... 473/464, 450, 458, 59, 207, 212, 422; D21/684, 692–694; 482/126, 139, 118, 482/119, 116, 114
See application file for complete search history.

(56) References Cited

U.S. PATENT DOCUMENTS

| | | | | |
|---|---|---|---|---|
| 2,529,347 A | * | 11/1950 | Mohler et al. ..... | A63B 21/0004 482/126 |
| 2,543,729 A | * | 2/1951 | Magida .............. | A63B 21/0004 482/118 |
| 2,725,232 A | * | 11/1955 | Magida .............. | A63B 21/0004 482/118 |
| 2,972,271 A | * | 2/1961 | Gill .................... | B25B 23/1427 81/480 |
| 3,349,621 A | * | 10/1967 | Mullen ................ | A61B 5/225 482/122 |
| 3,515,384 A | * | 6/1970 | Alexander .......... | A63B 21/015 482/119 |
| 3,653,659 A | * | 4/1972 | Zinkin ................ | A63B 23/16 482/118 |
| 4,374,588 A | * | 2/1983 | Ruggles ............. | A63B 21/0004 482/118 |
| 4,465,276 A | * | 8/1984 | Cox .................... | A63B 21/0004 482/126 |
| 4,575,089 A | | 3/1986 | Corbett et al. | |
| 4,587,673 A | | 5/1986 | Boliard | |
| 4,623,141 A | * | 11/1986 | Salvino .............. | A63B 21/0455 482/127 |
| 4,629,186 A | * | 12/1986 | Aldridge ............ | A63B 21/0004 482/126 |

(Continued)

*Primary Examiner* — Mitra Aryanpour
(74) *Attorney, Agent, or Firm* — Erickson Kernell IP, LLC (57) ABSTRACT

A volleyball training device comprises left and right hand grips rotatable about a central hub between a fully open and fully closed position. Upon user grasping, a proper forearm position is established for volleyball play. After extended use the forearm position is maintained when the hand grips are rotated to the closed position placing the hands in a proper position for volleyball play. A locking assembly within the hub maintains the hand grips at user selectable positions.

19 Claims, 8 Drawing Sheets

(56) References Cited

U.S. PATENT DOCUMENTS

| | | | | |
|---|---|---|---|---|
| 4,753,434 | A * | 6/1988 | Salvino | A63B 23/16 |
| | | | | 482/121 |
| 4,795,163 | A | 1/1989 | Szabo | |
| 4,869,492 | A * | 9/1989 | Joutras | A63B 5/20 |
| | | | | 482/44 |
| 5,141,478 | A * | 8/1992 | Upper | A63B 23/16 |
| | | | | 482/118 |
| 5,165,696 | A | 11/1992 | Saha | |
| 5,167,596 | A * | 12/1992 | Ferber | A63B 21/0004 |
| | | | | 482/114 |
| 5,360,385 | A * | 11/1994 | Wang | A63B 23/16 |
| | | | | 482/126 |
| 5,460,385 | A | 10/1995 | Lazzeroni | |
| 5,529,551 | A * | 6/1996 | Chin | A63B 23/16 |
| | | | | 482/126 |
| 5,833,580 | A * | 11/1998 | Chiu | A63B 23/16 |
| | | | | 482/49 |
| 6,063,006 | A * | 5/2000 | Chiu | A63B 23/16 |
| | | | | 482/126 |
| 6,139,476 | A * | 10/2000 | Gallant | A63B 21/0004 |
| | | | | 482/114 |
| D458,322 | S * | 6/2002 | Rankin | D21/692 |
| 6,786,849 | B1 * | 9/2004 | Faulconer | A63B 21/0004 |
| | | | | 482/121 |
| 7,077,787 | B1 * | 7/2006 | Wiesman | A63B 21/025 |
| | | | | 482/127 |
| 7,137,930 | B1 * | 11/2006 | Carr | A63B 21/072 |
| | | | | 482/98 |
| D561,850 | S * | 2/2008 | Yang | D21/684 |
| 7,789,815 | B2 * | 9/2010 | An | A63B 21/0004 |
| | | | | 482/126 |
| 7,824,311 | B1 * | 11/2010 | Hsu | A63B 21/4047 |
| | | | | 482/126 |
| D634,796 | S * | 3/2011 | Batiste | D21/684 |
| 7,955,237 | B2 * | 6/2011 | Bisson | A63B 21/0004 |
| | | | | 482/126 |
| 8,075,427 | B2 | 12/2011 | Millsap | |
| D654,126 | S * | 2/2012 | Eckermann | D21/684 |
| 9,415,262 | B2 * | 8/2016 | An | A63B 23/16 |
| | | | | 482/49 |
| D810,848 | S * | 2/2018 | Claesson | D21/692 |
| 2002/0151418 | A1 * | 10/2002 | Wu | A63B 21/0004 |
| | | | | 482/126 |
| 2003/0190984 | A1 | 10/2003 | Selburg | |
| 2009/0062091 | A1 * | 3/2009 | Daniel | A63B 21/4035 |
| | | | | 482/139 |
| 2012/0083369 | A1 | 4/2012 | Millsap | |

\* cited by examiner

VOLLEYBALL TRAINING AID

CROSS-REFERENCE TO RELATED APPLICATIONS

This application claims the benefit of co-pending provisional application Ser. No. 62/369,258, filed on Aug. 1, 2016, entitled VOLLEYBALL TRAINING AID.

FIELD OF THE INVENTION

This device relates to a volleyball training technique and, more particularly, to a training aid which establishes proper position of the forearms and hands for contacting a volleyball during play.

BACKGROUND OF THE INVENTION

In the sport of volleyball the proper positions for the hands and forearms to contact the volleyball, whether to bump, pass, set or serve-receive the ball are important. In some cases the player's forearms are improperly pronated such that the volleyball will strike the player's radius bone(s) causing an undesirable deflection/shank of the ball therefrom. It is desirable to position the forearms to present a flat plane, such that a maximum contact area is presented to the oncoming volleyball.

Various devices have been proposed in an attempt to position the player's hands and forearms at a proper position for volleyball contact. However, such devices were cumbersome in construction and/or use both in training and game play environments.

Accordingly, it is desirable to have a simple training device which effectively establishes the hands and forearms of the user at a proper ball striking position.

SUMMARY OF THE INVENTION

In response thereto I have established a hands-on device which establishes a proper hands/forearm combination needed to effectively contact the volleyball. My device comprises left and right hand grips, or handles, rotatable about a central hub between the fully open and closed positions. Each handle may have an upper seat, or depression, for the user's thumbs and a lower seat, or depression, for the user's index fingers. Generally these seats are located proximate an end of the respective handle. Upon wrapping the fingers about the respective handles, the thumbs and index fingers are respectively seated therein. Upon proper grasping of the respective handles at the fully open position, the user's forearms are at a desired supinated position to present a maximum flat area for volleyball contact. The handles may be selectably rotatable from the open position, at which the hands are at a fully spaced-apart, supinated position, towards a closed position at which the hands are in an adjacent facing position corresponding to a proper hand alignment during volleyball play. At the closed position, the forearms remain in the desired supinated position.

As discussed in more detail below, my volley ball training device may include a first handle and a second handle movable with respect to one another about a shared pivot point, which may be located in the central hub. Each handle may extend away from the pivot point and toward their respective distal ends. The handles may be moved to a first configuration wherein the distal end of the first handle is a first distance from the distal end of the second handle. The handles may also move to a second configuration wherein the distal end of the first handle is a second distance (that is greater than the first) from the distal end of the second handle. The term distance as used herein also includes a distance of nil or zero. The first configuration may be a fully closed position, wherein the handles are adjacent each other, and the second configuration may be a fully open position, wherein the handles are as far apart as allowed by the device. It is foreseen that other distances between fully open and closed may also be utilized.

The handles may include a plurality of the aforementioned depressions for receiving the thumbs and/or fingers of a user of the device. The handles may have first depressions on top of the respective handles for receiving the user's thumbs, and they may have second depressions on the undersides of the handles for receiving the user's index finger or other fingers.

The training device comprises a locking mechanism that may keep the handles at selectable positions, which may include fully closed, fully open and other positions between the fully closed and fully open positions. The handles are fixed with respect to one another when the locking mechanism is engaged, and the handles are movable with respect to one another when the locking mechanism is disengaged. The locking mechanism may automatically engage when the handles reach designated positions such as the fully closed and fully open positions or positions therebetween. The locking mechanism may be disengaged by pressing a release, such as a button or switch, and the release may be spring biased. The locking mechanism may take various forms such as an annular member located in the hub that has lugs extending therefrom. As described in more detail below, the lugs may be selectively placed into slots associated with various handle positions to lock the handles in certain positions.

It is therefore a general object of this invention to provide a volleyball training device which establishes the hand/forearm combination at a proper ball striking position.

Another object of this invention is to provide a device, as aforesaid, which is grasped by the left and right hands of the user so as to establish a proper forearm position.

A further object of this device, as aforesaid, is to provide seats for the respective thumbs of the user.

Another further object of this device, as aforesaid, is to provide seats for the respective index fingers of the user.

Another object of this device, as aforesaid, is to provide left and right hand grips which are rotatable between a first training position and a final volleyball play position.

A still further object of this device, as aforesaid, is to provide a plurality of hand grip positions between the first training position and ultimate volleyball play position.

A further object of this device, as aforesaid, is to provide a locking mechanism which maintains the hand grips at selectable positions.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

Illustrative embodiments of the invention are described in detail below with reference to the attached drawing figures, and wherein.

DESCRIPTION

Figure 1:
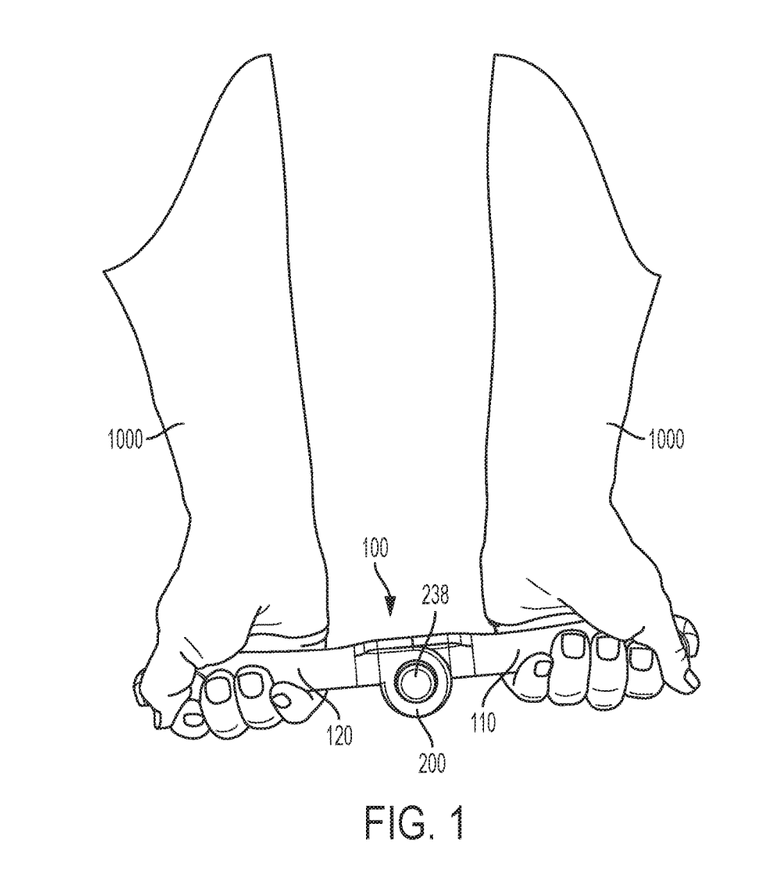
FIG. 1 illustrates a grasping of a volleyball training device in accordance with an exemplary embodiment of the present invention in a fully open position.

Turning more particularly to the drawings, FIG. 1 shows a grasping of the left 110 and right 120 handles, also referred to herein as hand grips or just grips, of the volleyball training device 100 at its fully open 180° position. The thumbs of the user are positioned within seats or depressions 112, 122 (as best seen in FIGS. 3-6) with the index fingers positioned within seats or depressions 114, 124 (as best seen in FIGS. 7, 11, 16 and 19). At this position the forearms 1000 of the user are fully supinated as the palms of the user are facing upward upon grasping of the device. Thus, the forearms 1000 of the user present a maximum area for volleyball contact. It is noted that the placement of the fingers along the respective hand grips 110, 120 will vary according to hand size.

Figure 2:
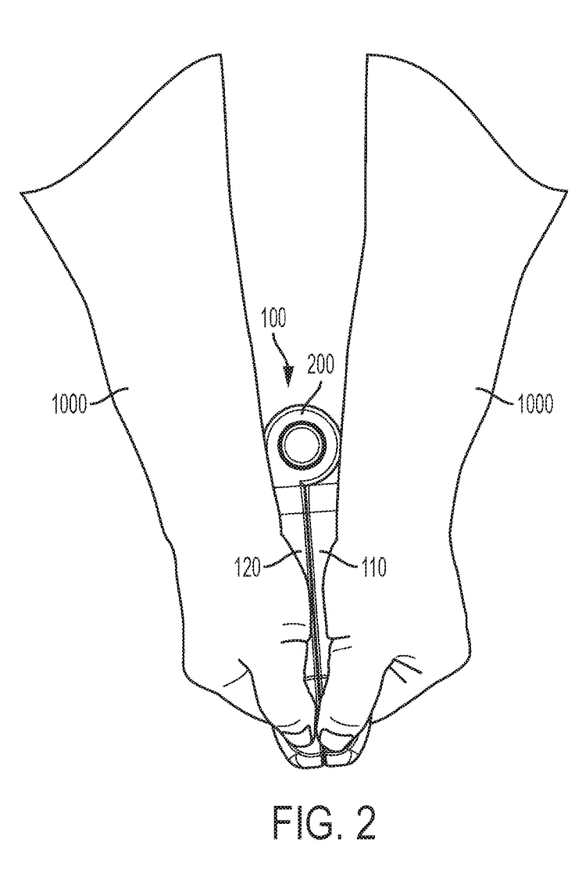
FIG. 2 illustrates a grasping of the volleyball training device of FIG. 1 in a fully closed position.
Figure 3:
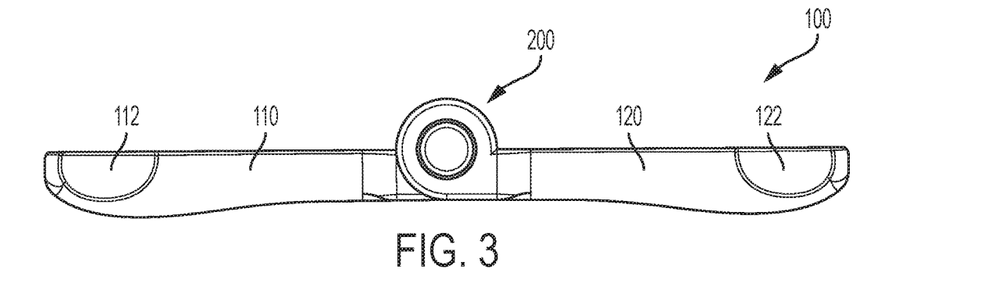
FIG. 3 is the volleyball training device of FIG. 1 in a fully open position.

FIG. 2 shows a grasping of the device at its fully closed position. At this position the user's hands are pronated, i.e., in an adjacent/facing volleyball striking position. The forearms are not pronated due to the established muscle memory arising from the use of the device in its open (FIG. 3) and intermediate or partially open (FIGS. 4 and 5) positions. As such the forearms 1000 present an optimum planar area for volleyball contact.

To achieve the above positions the hand grips 110, 120 are rotatable about hub 200 from a straight line (FIG. 1) to the side-by-side (FIGS. 2 and 6) relationship. Thumb seats 112, 122 and finger seats 114, 124 are likewise rotated to adjacent positions. Upon maintenance of the seated thumbs and index fingers during grip rotation the hands are in a proper position for volleyball play. Due to the muscle memory established by previous use of the device at various positions, the forearms 1000 of the user resist pronation. Thus, an optimum area of forearm contact with the volleyball is presented by the user at the FIG. 2 position.

Figure 4:
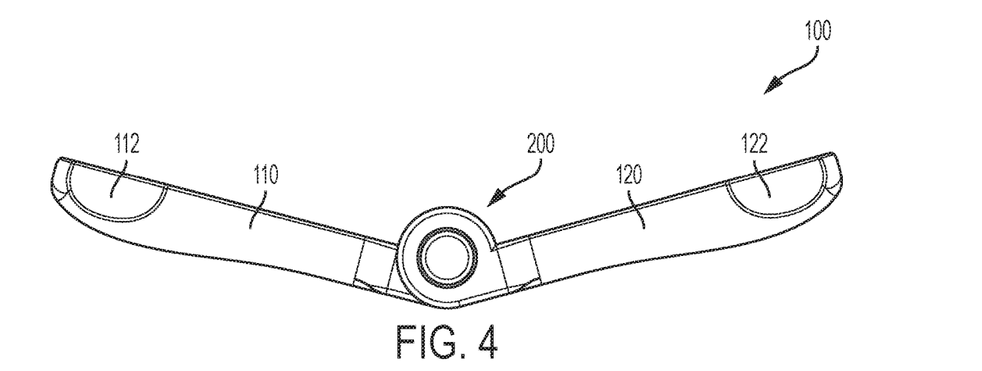
FIG. 4 is the volleyball training device of FIG. 1 in a partially open position approximating an angle of 150°.
Figure 5:
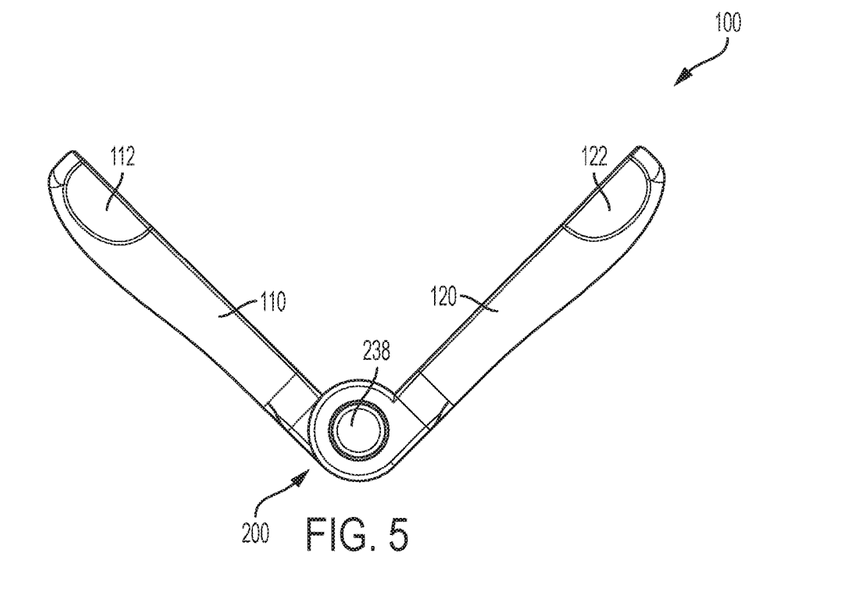
FIG. 5 is the volleyball training device of FIG. 1 in a partially open position approximating an angle of 90°.
Figure 6:
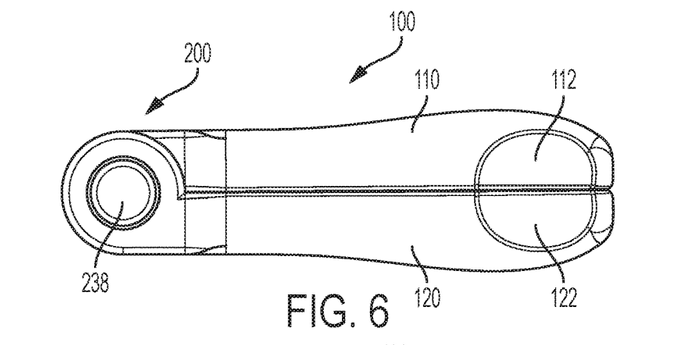
FIG. 6 is a top view of the volleyball training device of FIG. 1 in a closed position.
Figure 7:
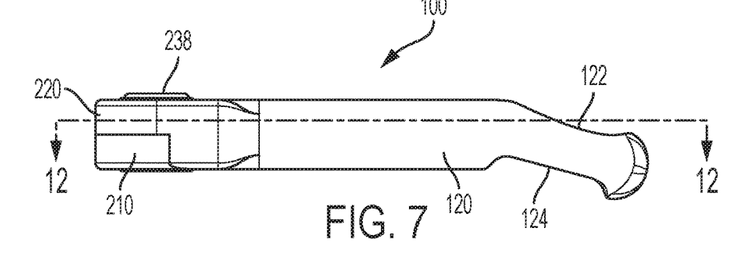
FIG. 7 is a side view of the volleyball training device of FIG. 6 in a closed position.
Figure 8:
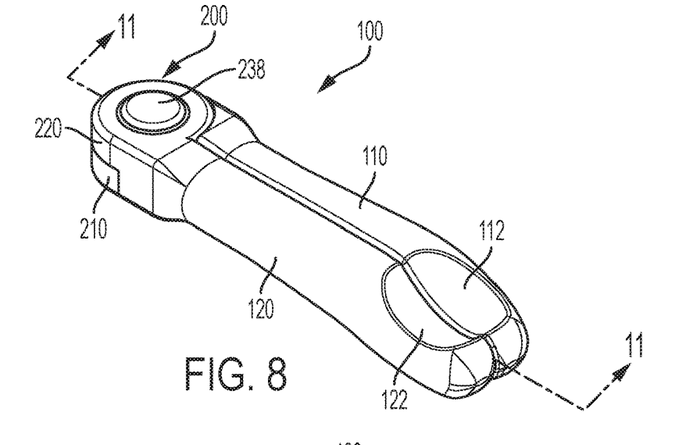
FIG. 8 is a perspective view of the volleyball training device of FIG. 6 in a closed position.
Figure 9:
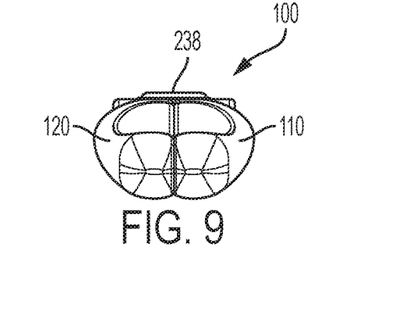
FIG. 9 is an end view of the volleyball training device of FIG. 6 in a closed position.

It is understood that prior to this FIG. 2 closed position the device may be used in the intermediate, or partially open, positions shown in FIGS. 4 and 5. Thus, the muscle memory can be gradually established over a series of grip positions between the fully open (FIG. 1) and closed (FIG. 2) positions so that forearm pronation is resisted. It is foreseen that the partially open positions may not be necessary or desired, and accordingly the device 100 may not utilize such positions.

As shown in FIGS. 7, 9, 11, 15 and 18, the distal ends of the respective grips 110, 120, including seats 112, 114, 122, 124, are slightly downwardly angled. I have found that this angle enhances a proper seating of the thumbs and index fingers within their respective seats and proper forearm supination.

The selectable rotation of the hand grips 110, 120 among the fully open, intermediate and fully closed positions occurs about the central hub 200. A detent or locking mechanism 230, located within the central hub 200, locks the hand grips 110, 120 at these positions so that the user can effectively use the device 100 during volleyball play.

The hub 200 comprises lower 210 and upper 220 housings. Lower housing 210 includes a race 212 for receiving the depending lip 222 of upper housing 220. Upon seating of the lip 222 within the race 212, rotation of the housings 210, 220 is established about a vertical axis passing therethrough. This vertical axis is established by a rivet 229 which connects housings 210, 220.

It is understood that various forms of elements can be used to lock the hand grips 110, 120 at the various angular relationships shown in FIGS. 1-5.

A locking/detent mechanism 230 within the connected housings 210, 220 maintains the grips 110, 120 at selectable positions. Within the lower housing 210 is a circular post 234 for passage of rivet 229 therethrough. Rivet 229 serves as the pivot point around which grips 110, 120 rotate. Mounted about post 224 is a spring 231. Locking mechanism 230 comprises an annular member 232 having opposed lugs 233 mounted atop spring 231. Lugs 233 are configured to be seated within slots found within the lower and upper housings 210, 220. Within the upper housing 220 are a series of diametrically-paired slots 236a, 236b, 236c for reception of lugs 233 therein as biased by the underlying spring 231. Within the lower housing 210 are slots 216. Lugs 233 remain at least partially within slots 216 at all times and become seated within slots 236a, 236b, 236c only when the locking mechanism 230 is engaged.

At the fully open position, slots 236a align with slots 216 in the lower housing 210 such that the spring 231 urges the seated lugs 233 into the overlying slots 236a. As the lugs 233 are partially within the aligned slots 216/236a of the housings 210, 220 the rotation of grips 110, 120 is precluded. Thus, the grips 110, 120 are automatically locked at a fully open 180° position.

Figure 10:
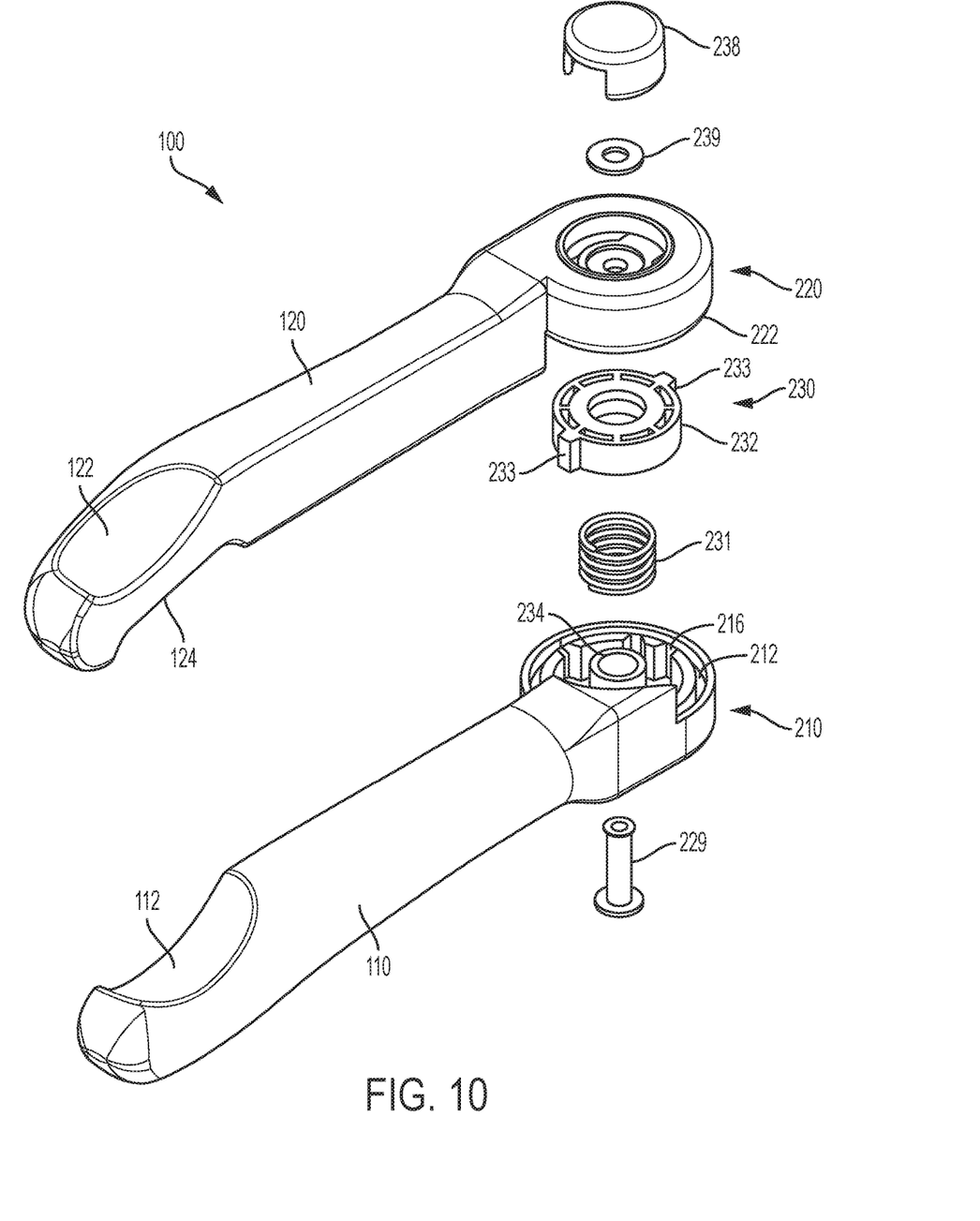
Figure 11:
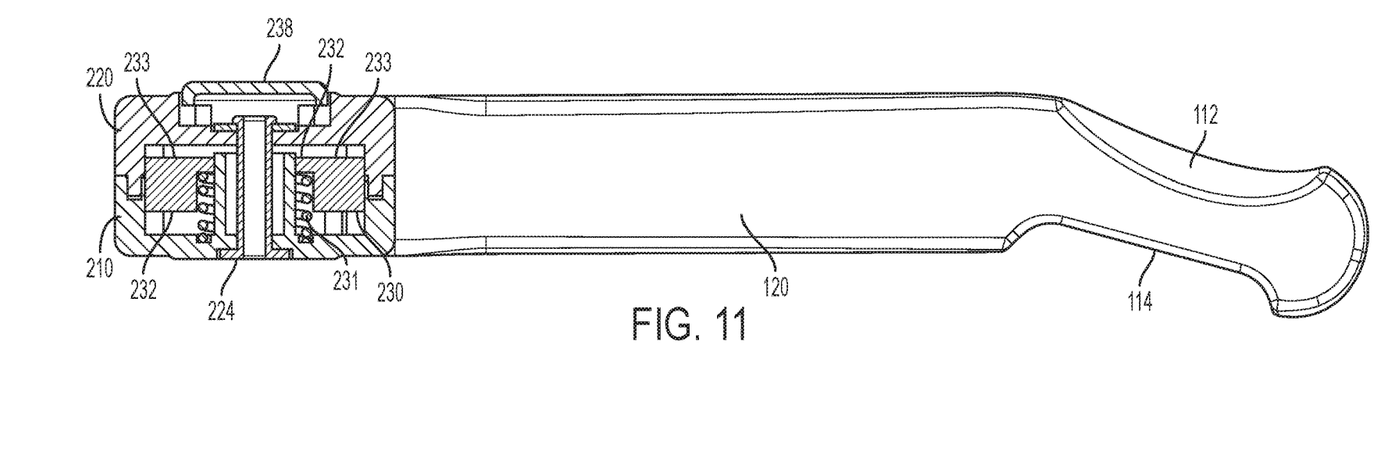
FIG. 11 is a cross sectional view of the volleyball training device of FIG. 8.
Figure 12:
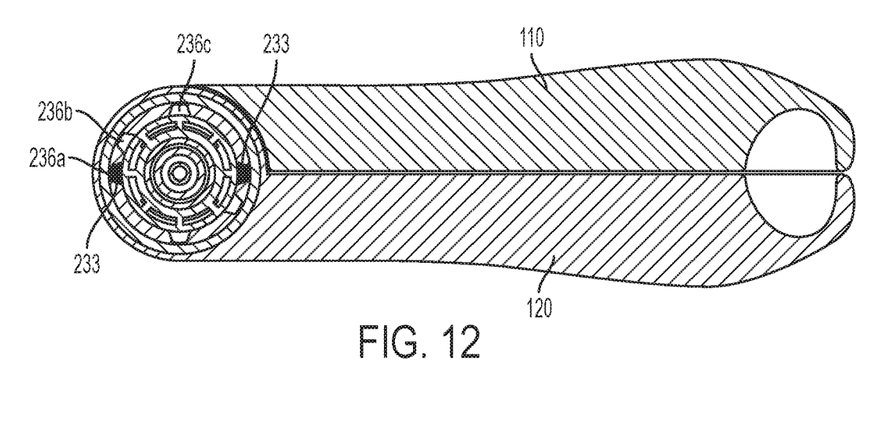
FIG. 12 is a cross sectional view of the volleyball training device of FIG. 7.
Figure 13:
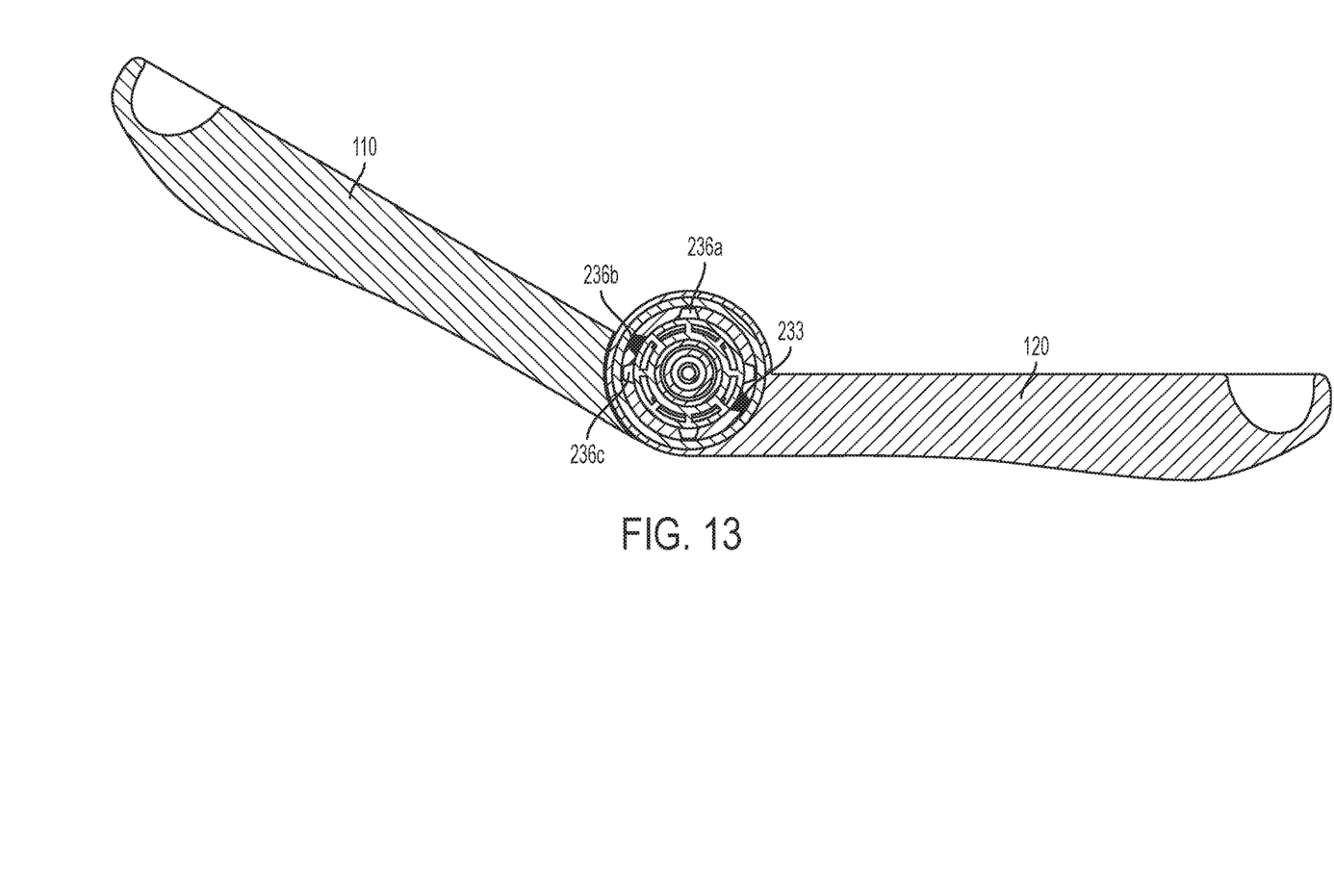
FIG. 13 is a cross sectional view of the volleyball training device of FIG. 7 showing the device in a partially open position.
Figure 14:
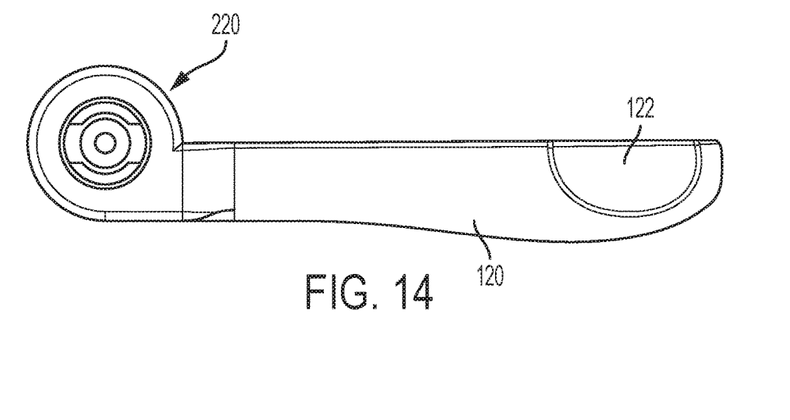
FIG. 14 is a top view of the right hand grip and associated top housing of the volleyball training device of FIG. 1.
Figure 15:
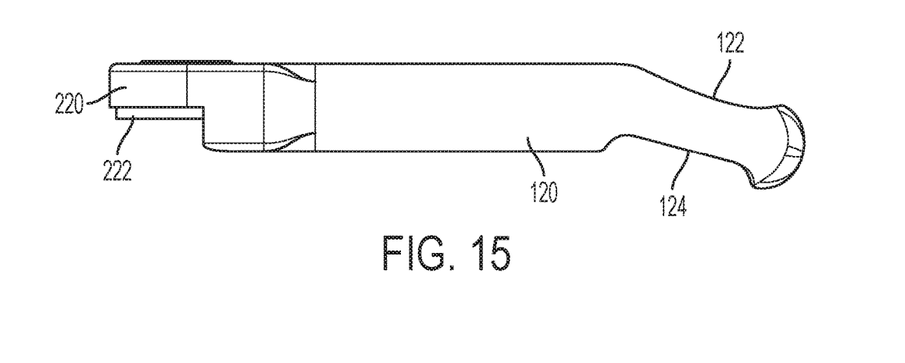
FIG. 15 is a side view of the right hand grip and associated top housing of the volleyball training device of FIG. 1.
Figure 16:
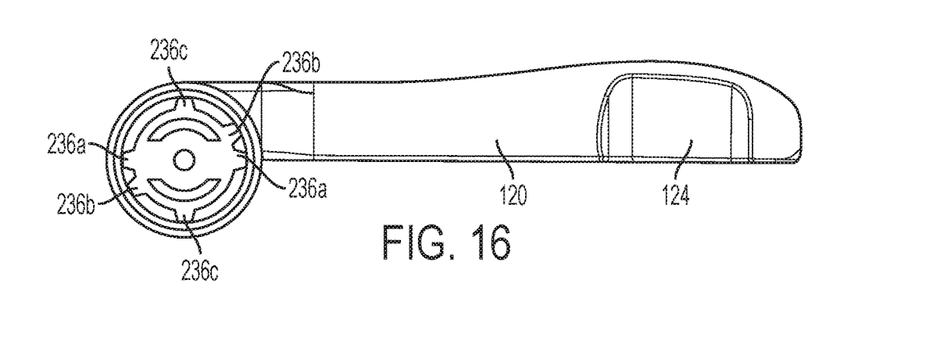
FIG. 16 is a bottom view of the right hand grip and associated top housing of the volleyball training device of FIG. 1.
Figure 17:
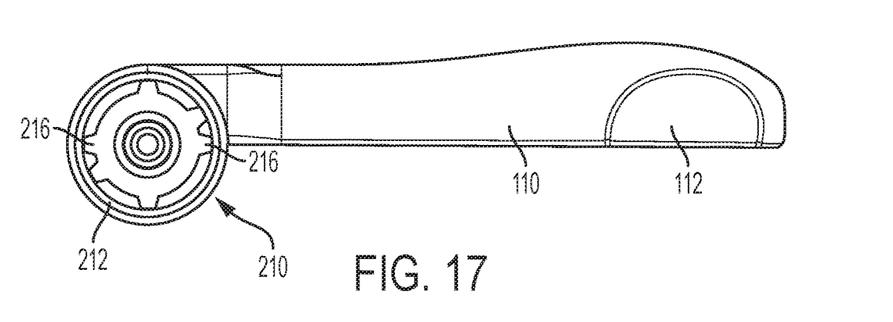
FIG. 17 is a top view of the left hand grip and associated bottom housing of the volleyball training device of FIG. 1.
Figure 18:
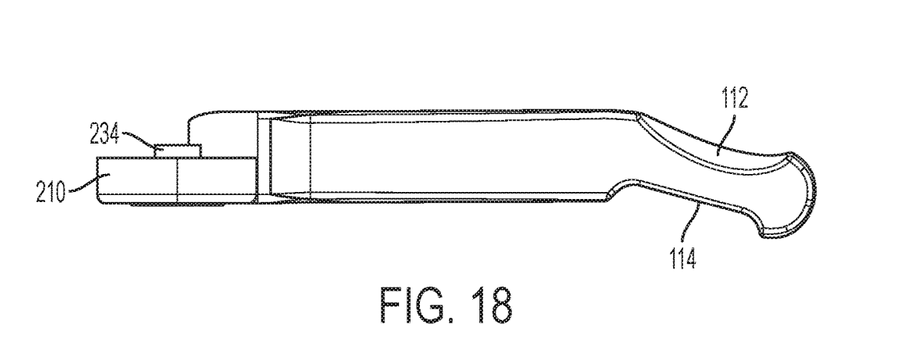
FIG. 18 is a side view of the left hand grip and associated bottom housing of the volleyball training device of FIG. 1.
Figure 19:
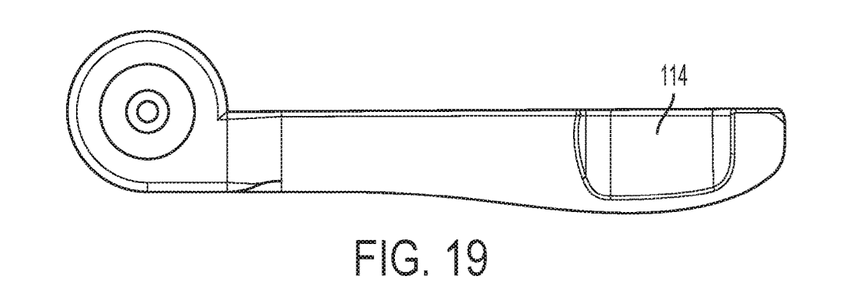
FIG. 19 is a bottom view of the left hand grip and associated bottom housing of the volleyball training device of FIG. 1.

To overcome the spring 231 bias, a button 238/washer 239 combination is reciprocally mounted within the upper housing 220 in a bearing relationship atop annular member 232 (FIG. 10). Upon button 238 depression, spring 231 is compressed which unseats lugs 233 from the slots 236a in the upper housing 220. Thus, relative rotation of the housings 210, 220 about the vertical axis is allowed. Rotation of the grips 110, 120 occurs until the next pair of slots 236b in the upper housing 220 is aligned with the underlying lugs 233. Upon alignment the spring 231 bias urges lugs 233 into the slots 236b thus automatically locking the hand grips 110, 120 at an angle of approximately 150° (FIG. 13).

Depression of button 238, as above described, unseats the lugs 233 from the upper housing 220 which allows for rotation of the grips 110, 120 until slots 236c align with the underlying lugs 233. The spring 231 bias seats a portion of lugs 233 therein and an automatic locking of the hand grips 110, 120 at an angle of approximately 90° is achieved (FIG. 5).

Upon button depression, further rotation of hand grips 110, 120 is provided upon button 238 depression to a fully closed position (FIGS. 2 and 6), e.g., that slots 236a are aligned with the underlying lugs 233. Again, the spring 231 urges the lugs 233 into the slots so as to automatically lock the hand grips 210, 220 at this position.

It is understood that the button 238 depression may be maintained by the user such that the lugs 233 remain unseated from the upper housing 220 slots. Thus the grips 110, 120 may be directly rotated between the fully open and closed positions.

Accordingly, the device 100 may be rotated to and locked at fully open, intermediate and fully closed positions. Upon release of the button 238, automatic locking of the grips 110, 120 at designated positions, as above described, occurs. This succession of positions allows the user to successively train at these successive positions such that a desired supination of the forearms is first established at the fully open position and then successively maintained as the device is used at its fully closed position.

As above other forms of locking assemblies may be used in lieu of assembly 230 to preclude grip 110, 120 rotation, such as a wing nut/bolt combination, screw/nut combination, latch/catch combination, locking sleeve, magnetic catches, etc.

To use training device 100, a user simply presses button 238 and moves grips 110, 120 to the desired designated configuration, whether that be fully open, fully closed or some intermediate position. As noted previously, it is understood that the device may not have intermediate positions between fully open and fully closed. The device 100 automatically locks the grips 110, 120 into the designated configuration. The user places their thumbs within depressions 112, 122 and their index fingers within depressions 114, 124 (FIGS. 1 and 2). The user's forearms 1000 will be supinated so that the user is in the proper form to strike a volleyball. The user continues grasping the training device 100 as the user practices striking the ball so that the user learns what it feels like to properly strike the ball. Also, as noted previously, the user will acquire muscle memory arising from the use of the device 100 and eventually the user will no longer need the device 100 to properly strike the ball. Training device 100 can be used by volleyball players at all experience levels and can be used as a coaching tool that players can use during formal or informal volleyball practices.

It is to be understood that while certain forms of this invention have been illustrated and described, it is not limited thereto.

Having thus described the invention, what is claimed as new and desired to be secured by Letters Patent is:

1. A training device for the game of volleyball comprising:
    a first handle and a second handle wherein said handles are movable with respect to one another about a shared pivot point, each said handle extending away from said pivot point and terminating in a distal end, wherein each said distal end remains a fixed distance from said pivot point while said handles are in motion about said pivot point, said handles movable to a first configuration and a second configuration such that in the first configuration said distal end of said first handle is a first distance from said distal end of said second handle and in the second configuration said distal end of said first handle is a second distance from said distal end of said second handle, said second distance being greater than said first distance;
    a first housing attached to said first handle and a second housing attached to said second handle, said first and second housings rotatable about a shared axis passing through said first and second housings wherein said axis is aligned with said pivot point, said first and second housings rotating when said first and second handles are moved, said first housing having a plurality of internal slots; and
    a locking mechanism comprising an annular member and a lug extending from said annular member, at least a portion of said lug being located in one of said internal slots when said locking mechanism is engaged, said first and second handles being fixed with respect to one another when said locking mechanism is engaged and said handles movable with respect to one another when said locking mechanism is disengaged.

2. The training device of claim 1, wherein said locking mechanism is engaged when said handles are in said second configuration.

3. The training device of claim 2, wherein said locking mechanism is engaged when said handles are in said first configuration.

4. The training device of claim 2, wherein said locking mechanism engages automatically when said handles are in said second configuration.

5. The training device of claim 4, wherein said locking mechanism is disengaged by pressing a spring biased release.

6. The training device of claim 5, wherein said release is a button.

7. The training device of claim 6, wherein in said first configuration said distal end of said first handle is proximate said distal end of said second handle such that said first distance is nil.

8. A training device for the game of volleyball that helps to configure the forearms of a user in a supinated position for striking the volleyball, the training device comprising:
    a first grip and a second grip wherein said grips are movable with respect to one another about a shared pivot point, each said grip extending away from said pivot point and terminating in a distal end, wherein each said grip comprises a first depression and a second depression, said first depression for receiving a thumb of the user and said second depression for receiving an index finger of the user, each said grip having said first depression on top of said grip and said second depression on an underside of said grip, said first and second depressions on each said grip and said distal ends of each said grip angled downwardly;
    a first housing attached to said first grip and a second housing attached to said second grip, said first and second housings rotatable about a shared axis passing through said first and second housings wherein said axis is aligned with said pivot point, said first and second housings rotating when said first and second grips are moved, said first housing having a plurality of internal slots; and a locking mechanism, said first and second grips being fixed with respect to one another when said locking mechanism is engaged and said grips movable with respect to one another when said locking mechanism is disengaged.

9. The training device of claim 8, wherein said grips are movable to a first configuration and a second configuration such that in the first configuration said first depression on said first grip is a first distance from said first depression on said second grip and in the second configuration said first depression on said first grip is a second distance from said first depression on said second grip, said second distance being greater than said first distance.

10. The training device of claim 9, wherein said locking mechanism is engaged when said grips are in said second configuration.

11. The training device of claim 10, wherein said locking mechanism is engaged when said grips are in said first configuration.

12. The training device of claim 10, wherein said locking mechanism engages automatically when said grips are in said second configuration.

13. The training device of claim 12, wherein said locking mechanism is disengaged by pressing a spring biased release.

14. The training device of claim 13, wherein said locking mechanism comprises a lug extending from an annular member.

15. The training device of claim 14, wherein in said first configuration said first depression on said first grip is proximate said first depression on said second grip such that said first distance is nil.

16. A training device for the game of volleyball that helps to configure the forearms of a user in a supinated position for striking the volleyball, the training device comprising:

a first handle and a second handle wherein said handles are movable with respect to one another about a shared pivot point, each said handle extending away from said pivot point and terminating in a distal end, wherein each said distal end remains a fixed distance from said pivot point while said handles are in motion about said pivot point, said handles movable to a first configuration and a second configuration such that in the first configuration said distal end of said first handle is a first distance from said distal end of said second handle and in the second configuration said distal end of said first handle is a second distance from said distal end of said second handle, said second distance being greater than said first distance;

a first housing attached to said first handle and a second housing attached to said second handle, said first and second housings rotatable about a shared axis passing through said first and second housings wherein said axis is aligned with said pivot point, said first and second housings rotating when said first and second handles are moved, said first housing having a plurality of internal slots;

a plurality of depressions for gripping said handles, each of said handles having a first depression and a second depression formed therein, said first depression for receiving a thumb of the user and said second depression for receiving an index finger of the user, each said handle having said first depression on top of said handle and said second depression on an underside of said handle; and a locking mechanism comprising an annular member and a lug extending from said annular member, at least a portion of said lug being located in one of said internal slots when said locking mechanism is engaged, said first and second handles being fixed with respect to one another when said locking mechanism is engaged and said handles movable with respect to one another when said locking mechanism is disengaged.

17. The training device of claim 16, wherein said handles are movable to a third configuration such that said distal end of said first handle is a third distance from said distal end of said second handle, said third distance being greater than said first distance and less than said second distance.

18. The training device of claim 17, wherein said locking mechanism is automatically engaged when said handles are in said first, second, and third configurations and said locking mechanism is disengaged by pressing a spring biased release.

19. The training device of claim 18, wherein in said first configuration said distal end of said first handle is proximate said distal end of said second handle such that said first distance is nil.

* * * * *